United States Patent

[11] 3,586,998

| [72] | Inventor | Gordon Gould<br>329 E. 82 St., New York, N.Y. 10028 |
|---|---|---|
| [21] | Appl. No. | 854,006 |
| [22] | Filed | July 28, 1969 |
| [45] | Patented | June 22, 1971<br>Continuation of application Ser. No.<br>345,903, Feb. 19, 1964, now abandoned. |

[54] PULSED LASER OUTPUT CONTROL
12 Claims, 6 Drawing Figs.

[52] U.S. Cl. ................................................ 331/94.5,
330/4.3, 250/199
[51] Int. Cl. ............................................... H01s 3/11,
H01s 3/10, H01s 1/06
[50] Field of Search ........................................ 331/94.5;
330/4.3; 250/199

[56] References Cited
UNITED STATES PATENTS

| 3,395,366 | 7/1968 | Snitzer | 331/94.5 |
| 3,229,222 | 1/1966 | Sorokin et al. | 331/94.5 |
| 3,270,291 | 8/1966 | Kosonocky | 331/94.5 |
| 3,319,182 | 5/1967 | Aagard | 331/94.5 |
| 3,365,678 | 1/1968 | Maurer | 331/94.5 |
| 3,096,767 | 7/1963 | Gresser et al. | 351/16 |
| 3,098,112 | 7/1963 | Horton | 331/94.5 |
| 3,281,713 | 10/1966 | Soules | 331/94.5 |
| 3,289,099 | 11/1966 | Masters | 331/94.5 |
| 3,321,714 | 5/1967 | Tien | 331/94.5 |

OTHER REFERENCES

Baker et al., "Mode Selection And Enhancement With A Ruby Laser,", APPLIED OPTICS, 1, (5), Sept. 1962, p. 674

Masters et al. (RSI), "Laser Q-Spoiling Using an Exploding Film," REV. SCI. INSTR. 34, (4), April 1963, pp. 365—7.

Primary Examiner—Ronald L. Wibert
Assistant Examiner—R. J. Webster
Attorney—Darby & Darby ABSTRACT: "Giant pulse" laser apparatus is described in which an absorber material is disposed in the resonant cavity in a concentrated portion of the beam of light emitted by the pumped working medium (being preferably the same substance as the absorber material) so as to raise the energy threshold level at which oscillation occurs. Upon absorbing a sufficient level of emitted radiation, the absorber material becomes transparent to the emitted radiation, thus releasing the energy stored in the working medium as a "giant pulse."

INVENTOR.
GORDON GOULD

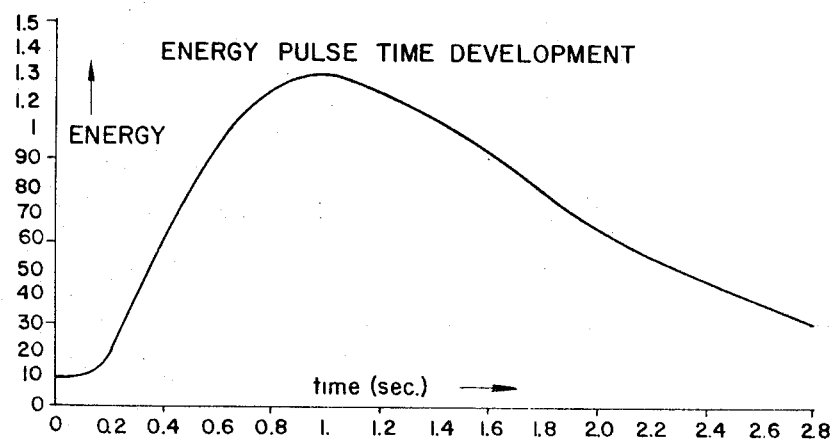
FIG. 3A
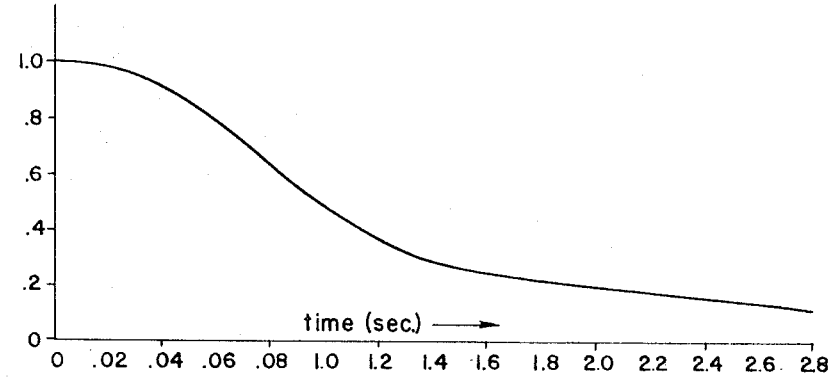
FIG. 3B
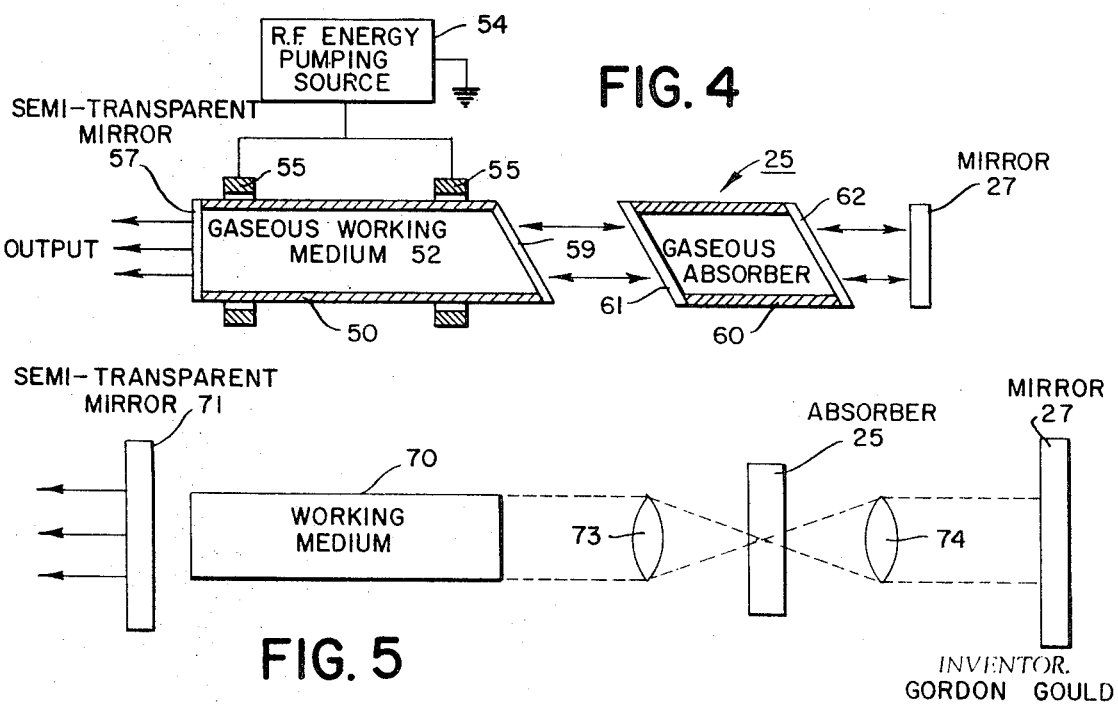
FIG. 4
FIG. 5
INVENTOR.
GORDON GOULD
BY Darby & Darby
ATTORNEYS

PULSED LASER OUTPUT CONTROL

This is a continuation of Ser. No. 345,903, filed Feb. 2, 1964, now abandoned.

This invention relates to lasers, or light amplifier devices, and more particularly to a laser system for the controlled production of high peak power output pulses.

The general theory and operation of laser type devices is well known as of this date and has been extensively described in the literature.

In many situations the desirability exists for producing single, high peak power pulses of energy from pulsed type lasers, as distinguished from the spikey, dispersed, and relatively lower peak power pulses normally produced by such devices. A typical application in which such sharply defined pulses are usable is in a rangefinder where the initiation of the pulses starts a timing cycle which is terminated when the pulse reflected from the object to which range is to be measured is received.

Several embodiments of apparatus are known for producing the desired single pulses of high peak power energy. One of these embodiments uses a Kerr cell as an optical shutter to control the production of the high peak power pulses.

The present invention is also directed to apparatus for producing high peak power output pulses from a laser. In accordance with the present invention, high peak power output pulses (sometimes called "giant pulses") are obtained from a laser by the use of an optical avalanche technique. In this technique an unpumped light absorber material is placed in the resonator cavity in the light transmission path of the laser's pumped working medium to control the threshold at which the laser will oscillate. The unpumped light absorber raises the energy threshold level at which oscillation occurs in the laser, from the threshold at which oscillation would occur in the absence of the absorber. The onset of oscillation at this higher threshold "burns through" The light absorber material to make it transparent. This establishes a low threshold or low loss condition for dumping the light energy stored in the laser-working medium and a high peak power output pulse is produced at the time of dumping.

In a preferred embodiment of the invention laser action is produced by a pumped laser-working medium or element, such as a solid rod free-running crystalline material (for example, ruby) or a gas, and a second unpumped element is placed between one light transmissive end of the pumped laser-working medium and its external reflector to serve as a light absorber. The second umpumped element, hereafter called the absorber, which is in the optical path of the laser-working medium and the external reflector, absorbs the light energy initially produced by the excitation of the laser-working medium by the pumping source. Due to the absorbing action, oscillation cannot occur in the laser at the normal threshold level since the losses in the resonator have been increased. The absorber continues its light absorption action, as the threshold of oscillation in the laser rod increases, until the absorber receives enough light from the pumped laser element to saturate it. That is, the two levels of the operative absorbing transition are pumped to the point where the atoms (or ions or molecules) are predominantly in the higher level and virtually no further absorption will take place. At this time the absorber effectively becomes transparent to the light emitted from the pumped laser element and the optical path to the external reflector is effectively fully opened. This permits the light from the pumped laser element to pass through the absorber to the reflector and be reflected back so that oscillation can occur in the pumped element and its stored light energy dumped. Due to the delay in producing oscillation in the laser rod, which is caused by the absorber, the threshold of oscillation is raised. This results in an increase in the stored energy density in the rod before it can be dumped at the time the absorber becomes transparent. Due to this delay the peak power of the laser output pulse is increased.

The optical avalanche technique of the present invention is applicable to substantially all types of laser-working media whether solid, liquid, or gaseous. The absorber media used may also be of suitably selected solid, liquid, or gaseous material. The optical avalanche technique is particularly advantageous since it permits the generation of high peak power output pulses by the use of an optical shutter action which requires no external power. Also, the material used as the absorbing media is preferably selected so as to be reusable, i.e. it is not destroyed by the production of a laser output pulse under normal rated output power conditions.

It is therefore an object of this invention to provide apparatus for producing high peak power output pulses from a laser.

A further object is to produce high peak power output pulses from a laser by the use of an optical avalanche technique.

An additional object is to provide apparatus for producing high peak power output pulses from a laser by an optical avalanche technique which uses no external power.

Another object of the present invention is to provide a laser system capable of producing high peak power output pulses which includes an optical light-absorbing medium in the light transmission and reflecting path of the laser-working medium.

Still a further object is to provide a laser for producing high peak power output pulses in which a gaseous absorbing medium is used to raise the threshold of oscillation of the laser. Other objects and advantages of the present invention will become more apparent upon reference to the following specification and annexed drawings, in which:

FIGS. 3A and 3B are energy output diagrams of a laser using the optical avalanche technique; and FIG. 4 is a diagram of a laser system using the optical avalanche technique in which a gaseous working medium and gaseous absorber material are utilized.

FIG. 5 is a diagram of a laser system using the optical avalanche technique for mode selection.

Several theories have been proposed to explain the production of the irregular, or spikey, pulse output of relatively low power of a pulsed laser operating under normal conditions. While none of these theories completely agrees with the observations made on operating lasers, they all approach the problem from the same general point of view. This same general approach does match, to some extent, the observations.

To explain the production of the spikey pulse output in a ruby laser, the various theories state that in the oscillatory condition, for one reason or another, the gain of the laser is pumped above its steady state valve because of the temporary absence of induced emission. Then, when induced emission does occur, the gain is driven below the steady state value necessary to sustain oscillation. During the time that the gain is decreasing, a pulse of radiation is generated. Eventually, the gain levels off and the energy field dies out with a time constant approaching that of the laser resonator. After this, the process repeats itself, and during the time that the pumping power remains constant, the amplitudes of the laser output pulsations are substantially limited to a value determined by this relaxation type oscillation.

From simple laser theory it can be shown that one of the conditions necessary for laser oscillations to occur requires that there exist a frequency for which simultaneously the gain through the laser-working medium equals or exceeds total system losses from output couplings, joule heating at reflectors, scattering from medium imperfections, diffraction, etc. A second condition requires that the phase shift over a path closing on itself, including phase shifts at the reflectors, be zero. The first of these conditions is the "gain" condition, the second is the "phase" condition. In the case of the ruby laser in common use, these conditions are satisfied for many frequencies within a relatively broad band. For example, in the case of a ruby rod 7 cm. long, oscillations may occur every 1.2 KMc over a band 300 KMc broad centered on $4.3 \times 10^5$ KMc.

The observed behavior of an operating ruby laser departs from predictions of the simple theory especially with regard to the time pulsating nature of the emitted radiation. Also, instability, resulting in a spikey modulation of the oscillation strength, is found when the energy buildup within the resonator lags behind the gain buildup of the working medium.

Figure 1:
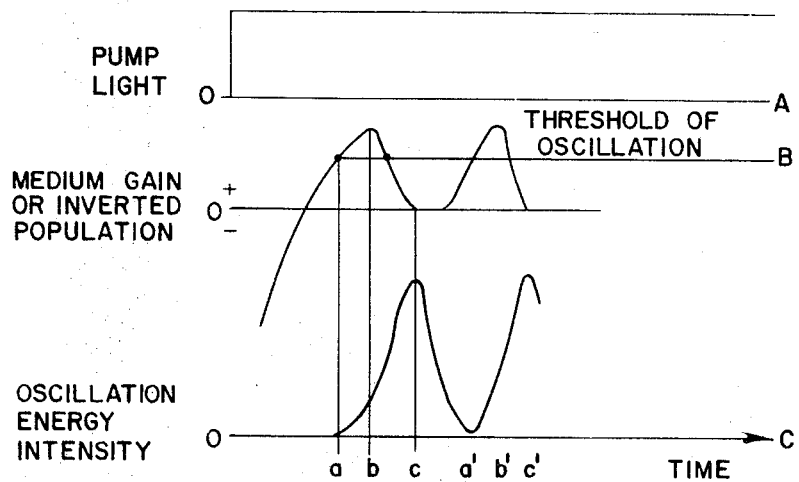
FIG. 1 is a diagram showing the energy buildup and oscillation conditions in a laser without an optical shutter.

FIG. 1 illustrates the approximate behavior of a typical pulse type ruby laser. At $t=0$ the pump light (line A) is turned on, and absorption of the pump energy by the ruby rod begins changing the laser-working medium gain (line B) from a very negative value towards the oscillation threshold. No significant increase in oscillation energy density or intensity (line C) occurs, however, until the working medium oscillation threshold is reached at point $a$ of line C, whereupon it begins to grow exponentially. At point $b$ of line C, the oscillation energy density has reached a value which would be sustained by the pump in the absence of the relaxation oscillation phenomenon. At this point, the rate of increase of working medium gain (inverted population difference) is zero, but the gain is substantially higher than that which the pump could maintain in the absence of relaxation oscillations. The oscillation energy density continues to build and overwhelms the pump, driving the working medium to transparency (zero gain). At this point, $c$, the energy density field begins to decay due to resonator losses. Under the usual conditions of ruby laser oscillation, the cycle repeats as in $a'$, $b'$, $c'$ of FIG. 1. It should be understood that for greater resonator losses, higher gain thresholds are needed to produce oscillation.

From this simple explanation, it can be seen that each oscillator spike which occurs when the medium is transparent, or at zero gain, tends to "dump" the energy stored in the medium.

If the threshold of oscillation is raised by introducing a time independent energy dissipation element in the system, the buildup of oscillation energy is inhibited and the working medium gain is not driven to zero. This results in an incomplete "dumping" of the energy. If, however, the oscillation threshold can be raised, thereby inhibiting oscillation energy buildup, and then dropped suddenly when oscillation is about to commence, the energy buildup will be minimally inhibited and the energy released by one spike will increase by the amount by which the threshold had been increased. This effect is termed "Q-spoiling" and it may be used to generate single, high peak power pulses.

One way of controlling the threshold of oscillation of a laser is to exert control on the reflection coefficient of the resonator cavity, and hence the predetermined state value of the gain. For example, the time required to pump a laser-working medium to its threshold of oscillation can be lengthened by maintaining the resonator reflection coefficient at a lower value, i.e. higher resonator loss. If this low reflection coefficient is kept constant, the time between oscillation pulsations would probably be longer, but all output pulsations will be substantially equal in amplitude.

If the reflection coefficient of the resonator is maintained at a relatively low value only until the gain necessary to achieve oscillation at this low value was obtained, and then if the reflection coefficient was rapidly increased to a larger value (lower resonator cavity loss), in a time which is short in comparison to the duration of a laser pulsation, the laser working medium would find itself with a gain in excess over that required to overcome the new low loss (high reflection coefficient) of the cavity to produce oscillation. If after achieving sufficient gain during the low reflection coefficient period to start oscillation and drop the working medium gain towards zero, the reflection coefficient of the cavity is suddenly raised, oscillation occurs at the higher gain level needed for the low reflection coefficient. Thus the gain of the laser is pumped well above its value originally needed for oscillation at the high resonator loss (low reflection coefficient) condition, and a pulsation of short duration and large peak amplitude occurs. The amplitude of the pulsation will be greater than that produced by a laser operating under normal conditions without controlled change of resonator gain, since the oscillation is produced by a gain in excess of that normally required for oscillation, i.e. the threshold is raised giving a longer time for oscillation energy buildup and thus having more energy available to be dumped. A number of small output pulsations may appear following the first large pulse corresponding to the new low loss condition of the resonator.

The action described above may be considered to be a light shutter action since, effectively, a shutter is opened at a predetermined time to decrease the optical losses in the resonator cavity. This light shutter action can be achieved by a light modulator, such as a Kerr cell. It may also be achieved with certain advantages in simplicity of apparatus by an optical avalanche technique which is described below.

The activated working medium in such condition contains a substantial amount of energy due to the presence of atoms, ions, or molecules at a higher energy level upon stimulation by electromagnetic radiation of the proper frequency. This stored energy can be released in a short time interval and is of a much greater magnitude than the relatively small amount of energy which would be added to the working medium by the source of exciting energy during an equally short time interval (as in normal, continuous operation).

Several mechanisms may be utilized to control resonant light amplifier apparatus to achieve this type of pulse operation.

One way of achieving the above type of pulse operation is by changing the effective number of excess excited atoms by means of the Zeeman or Stark effect. This may be accomplished by producing a sudden change in the magnetic or electrical fields, respectively.

Pulse operation can also be achieved by suddenly changing the resonant frequency of the working medium by the Zeeman or Stark effect (by changing the magnetic or electrical field in the cavity, for instance).

Pulsing may also be achieved by the use of a shutter mechanism, such as a rotating reflector or an electronic arrangement, such as a Kerr cell, to effectively attenuate the light in the closed path of the resonant light amplifier so that the losses are great enough to prevent self-sustained oscillation for certain conditions of the shutter.

While the Kerr cell apparatus described above is successful in producing the desired high peak power output pulses by light shutter action, it suffers from the disadvantage of requiring a relatively large peak power to operate the cell. In some cases the power required is comparable to that required to pump the laser itself.

Figure 2:
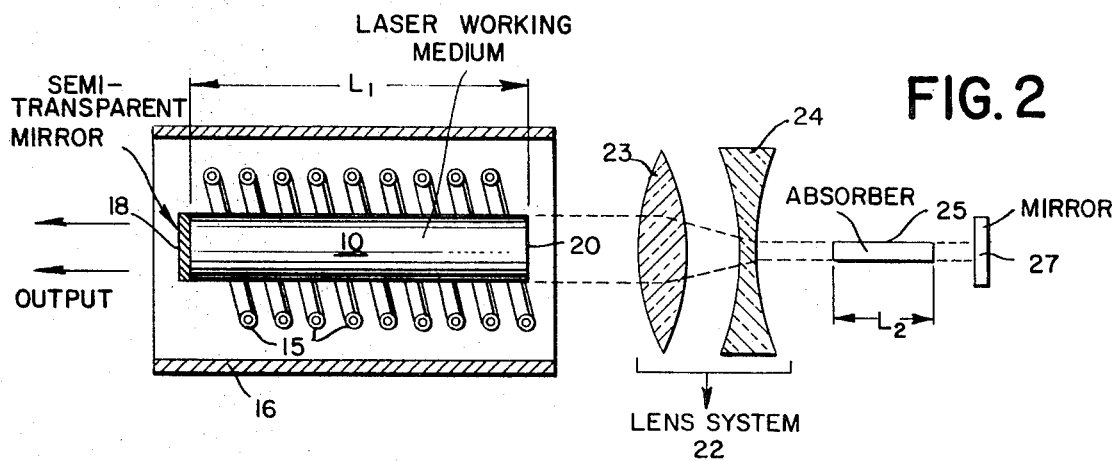
FIG. 2 shows a laser system using the optical avalanche technique for producing the high peak power output pulses.

FIG. 2 illustrates apparatus using an optical avalanche technique for producing short duration, high peak power output pulses by light shutter action. The apparatus includes the laser-working medium 10 which illustratively is a rod of ruby crystal material. The rod 10, which is of length $L_1$ and cross-sectional areas $A_1$, is surrounded by a conventional pumping lamp 15 powered from a suitable external current source (not shown). The lamp 15 may be any suitable type needed to induce electron transition from one state to another in the laser-working medium in the conventional manner of laser operation. Where ruby is used as the working medium, a krypton or Xenon lamp may be provided. If desired, the pumping lamp 15 may be encased within a suitable enclosure 16, all or a portion of the inner surface thereof being made reflective to reflect the pumping light onto rod 10.

One end of the laser rod 10 is coated with a partially light transmitting and reflecting material, such as a semireflective mirror 18. The laser light produced in rod 10 is partially reflected from mirror surface 18 and the laser's output is also produced at this end. The other end 20 of rod 10 is transparent to the laser light which can pass freely therethrough. This interface and others in the apparatus may be arranged at Brewster's angle to minimize reflection losses thereat.

The light exiting from end 20 of the rod 10 passes through a lens system 22 where it is demagnified, i.e. the entering beam is focused down into a smaller beam. A double convex lens 23 focuses the light from rod 10 into a narrower beam at the right-hand side of lens 23, while a diverging double concave lens 24 collimates the output beam of lens 23. It should be obvious that the lens system 22 may be replaced in whole or part by equivalent reflector or other optics, in a manner well known to those skilled in the art.

The collimated narrow beam at the right-hand side of double concave lens 24 is directed onto an absorber element 25, which is a rod of length $L_2$ and cross-sectional area $A_2$. In the embodiment being described, the absorber 25 illustratively is of the same material as the laser working medium 10, which is a ruby crystal. In this case the light produced by the rod 10 will be of the exact frequency needed to induce electron transition from one orbit to another of the atoms in absorber 25. This will occur in the same manner as the electron transition in working medium 10.

The absorber rod 25 is not excited (pumped) and both of its ends are left transparent to the laser light of rod 10. A mirror 27 is located adjacent the right end of absorber 25 to complete the laser resonator cavity. It should be obvious that the light from pumped rod 10 is demagnified by lens system 22 and transmitted through unpumped absorber 25 to be reflected by mirror 27. The reflected light passes through absorber 25, the lens system 22 and into the rod 10 through its transparent end 20. This light is again partially reflected by the semitransparent mirror 18.

The operation of the apparatus of FIG. 2 is as follows: When the pumping lamp 15 is turned on, the gain increases in the pumped laser crystal 10 until the threshold condition for oscillation is reached. This threshold condition is determined by both the loss suffered on reflection from the mirrors 18 and 27 and the loss due to absorption of the radiation in the unpumped crystal 25. When the threshold condition is reached the process of induced emission starts to generate a coherent optical field in the crystal 10, which in turn tends to drive down the gain in this crystal. At the same time the loss is also being reduced in the unpumped crystal rod 25 because of the removal of atoms from the absorbing ground state due to the absorption of the radiation from rod 10.

If the gain of crystal 10 and the loss of crystal 25 are both reduced at the same rate, as would be the case if the intensity of the optical radiation were the same in both crystals, then the optical field will merely decay from its value at the threshold oscillation. On the other hand, if the loss in crystal 25 is reduced at a faster rate than the gain, as would be the case if the intensity of the optical radiation were greater in the unpumped shutter crystal 25 than in the pumped working crystal 10, then the optical field in crystal 10 will build up from its initial value to a peak, and then rapidly decay as both gain and loss level off.

The latter condition actually prevails since the light output from crystal 10 is demagnified by the lens system 22 to produce a greater light intensity in absorber 25 than in the pumped crystal 10. For a sufficiently intense pulse from crystal 10, the absorber crystal 25 is rendered transparent to dump the energy stored in pumped crystal 10. Since dumping of the energy occurs at a higher than normal threshold, due to the presence of absorber crystal 25, the laser output pulse has a relatively high peak output power. The duration of the output pulse is relatively short since the absorber 25 switches from an absorbing to a transparent state extremely rapidly. As in the case of the Kerr cell shutter, successive output pulsations after the first giant pulse may be suppressed.

The mathematical description of the operation of the apparatus of FIG. 2 is as follows. Let the energy density in the first pumped crystal 10 be $\rho_1$ and that in the unpumped absorber crystal 25 be $\rho_2$. The total energy E in the resonator cavity is given by:

$$E = \rho_{<1} L_1 + \rho_{22} L_2, \quad (1)$$

where $A_i$ and $L_i$ are the area and length of the $i^{th}$ crystal and $L_1$ and $L_2$ and $A_1$ and $A_2$ are the lengths and cross-sectional areas of crystals 10 and 25 respectively. By conservation of energy we have:

$$\rho_1 A_1 = \rho_a 2 A_2. \quad (2)$$

The time rate of change of the energy in the resonator cavity, $dE/dt$, is the sum of three terms:

a. The rate of decay due to the finite time constant, $\tau$, of the resonator cavity: $-E/\tau$ b b. The rate of increase due to induced emission in the pumped crystal 10: $(n_2^{(1)} - n_1^{(1)}) h\nu B_1 A_1 L_1$ c. The rate of decay due to absorption in the absorber crystal 25: $-n_1^{(2)} - n_2^{(2)} h\nu B \rho_2 A_2 L_2$, where $n_{(j)}^{(i)}$ is the population density in the $j^{th}$ level in the $i^{th}$ crystal For simplicity consider only two nondegenerate levels 1 and 2, with $n_1 + n_2 = N =$ constant $h\Upsilon$ is the energy of a laser photon $B$ is the Einstein B coefficient.

Upon adding these rates of change, we obtain:

$$\frac{dE}{dt} = -\frac{E}{\tau} + \left(\frac{h\nu B}{L_1 + L_2}\right) E \left([n_2^{(1)} - n_1^{(1)}] L_1 - [n_1^{(2)} - n_2^{(2)}] L_2\right) \quad (3)$$

The time rate of change of the population density in pumped crystal 10 is determined by the competition between optical pumping and induced and spontaneous emission:

$$\frac{d}{dt}[n_2^{(1)} - n_1^{(1)}] = (2pn_1^{(1)} - 2An_2^{(1)}) - [n_2^{(1)} - n_1^{(1)}] B\rho_1 \quad (4)$$

where $p$ is the pumping rate and $A$ is the spontaneous emission rate. The time rate of change of the population density in absorber crystal 25 is determined by the competition between absorption and spontaneous emission:

$$\frac{d}{dt}[n_2^{(2)} - n_1^{(2)}] = -2An_2 - [n_2^{(2)} - n_1^{(2)}] B\rho_2 \quad (5)$$

After the threshold condition for the system is reached $(dE/dt) = 0$, the energy and population densities in both crystals are changing rapidly due to induced emission. Thus in equations (4) and (5) the small effect of the pumping and spontaneous emission terms may be neglected compared to the induced emission terms. These equations then become, using the relation of equation (2):

$$\frac{d}{dt}[n_2^{(1)} - n_1^{(1)}] = -\left(\frac{B}{L_1 + L_2}\right) E \frac{(n_2^{(1)} - n_1^{(1)})}{A_1} \quad (6)$$

$$\frac{d}{dt}[n_2^{(2)} - n_1^{(2)}] = -\left(\frac{B}{L_1 + L_2}\right) E \frac{(n_2^{(2)} - n_1^{(2)})}{A_2}. \quad (7)$$

At threshold, when $dE/dt = 0$, $$n_1^{(2)} = N^{(2)}, \; n_2^{(2)} = 0, \; E = E_o, \quad (8)$$

and equation (3) may be written:

$$\frac{[n_2^{(1)} - n_1^{(1)}] TH}{\frac{L_1 + L_2}{h\nu B \tau L_1}} = 1 + \alpha \quad (9)$$

where $$\alpha = \frac{h\nu B \tau L_2 N^{(2)}}{L_1 + L_2} \quad (10)$$

It can be seen from equation (9) that the quantity $\alpha$ has the significance that in the absence of the absorber crystal 25, $\alpha = 0$, and the threshold value of $[n_2^{(1)} - n_1^{(1)}]$ is given by $(L_1 + L_2)/(h\nu B \tau L_1)$. The effect of introducing the absorber crystal 25 is to increase the threshold value of the laser factor $1 + \alpha$.

The question next arises as to what is the condition that when threshold is reached, i.e., $(dE/dt) = 0$, will the energy field increase from its initial value $E_o$ so that its second derivative $(d^2E/dt^2) > 0$ because the loss in crystal 25 decreases faster than the gain in crystal 10. Upon differentiating equation (3), substituting from equations (5) and (6), and evaluating at $dE/dt=0$, the condition that the second derivative $(d^2E/dt^2)$ is greater than zero is obtained when: $A_1/A_2 > 1 + 1/\alpha$. (11)

Thus the amount of demagnification of the light beam from the working medium necessary to achieve automatic shutter action depends on the amount by which the threshold for oscillation has been increased by the addition of the absorber crystal. For a small increase in threshold, a large demagnification is required, and vice versa.

The shape of the pulsation of the laser system of FIG. 2 can be determined by integrating the three different equations (3), (6), and (7) subject to the initial conditions. At threshold:

$$\begin{cases} E = E_0, \; dE/dt = 0 \\ n_1^{(2)} = N^{(2)}, \; n_2^{(2)} = 0 \\ (n_2^{(1)} - n_1^{(1)}) = (1 + \alpha)\left[\dfrac{L_1 + L_2}{h\nu B \tau L_1}\right] = (n_2^{(1)} - n_1^{(1)})_{TH} \end{cases}$$

From equations (6) and (7) $(n_2^{(1)} - n_1^{(1)})$ may be obtained as a function of $d/dt(n_2^{(1)} - n_1^{(1)})$. Upon substitution into equation (3) the time integral may be computed directly and $E$ obtained as a function of the densities $[n_2^{(1)} - n_1^{(1)}]$ and $[n_2^{(2)} - n_1^{(2)}]$. This may be converted to a function only of $(n_2^{(1)} - n_1^{(1)})$ by the relation:

$$\frac{(n_1^{(2)} - n_2^{(2)})}{N_2} = \left(\frac{n_2^{(1)} - n_1^{(1)}}{(n_2^{(1)} - n_1^{(1)})_{TH}}\right)^{A_1/A_2} \quad (12)$$

which is obtained by taking the ratio of equations (6) and (7), and integrating over the population densities. Since $E$ as a function of $(n_2^{(1)} - n_1^{(1)})$ is now known, equation (6) can be integrated to obtain:

$$t = -\left(\frac{L_1 + L_2}{B}\right) A_1 \int_{(n_2^{(1)} - n_1^{(1)})_{TH}}^{(n_2^{(1)} - n_1^{(1)})} \frac{dx}{xE(x)}, \quad (13)$$

where
$$E(x) = E_0 + \beta \ln x + \gamma(1 - x) + \delta(1 - x^{A_1/A_2}), \quad (14)$$

where
$$\beta = \left(\frac{L_1 + L_2}{B\tau}\right) A_1, \; \gamma = h\nu A_1 L_1 (n_2^{(1)} - n_1^{(1)})_{TH}, \; \delta = h\nu A_2 L_2 N^{(2)}.$$

Equation (13) may be readily evaluated numerically.

FIG. 3A shows $E$ as a function of $\tau$ (time)/(1.8$\tau$) and FIG. 3B shows $$\frac{n_2^{(1)} - n_1^{(1)}}{n_2^{(1)} - n_1^{(1)}{}_{TH}},$$

which is the population excess normalized to the threshold value also as a function of $\tau/(1.8\tau)$ for a ruby laser and absorber system with the following previously defined parameters:

$$A_1/A_2 = 10$$
$$A_1 = \pi/4 \text{ cm.}^2$$
$$L_1 = 7 \text{ cm.}$$
$$L_2 = 7/3 \text{ cm.}$$
$$\alpha = 1$$

The time constant $\tau$ of the resonator is given as:

$$\tau = L/1 - r + \alpha_s(L_1 + L_2)C$$

where $L$ = length of resonator = 20 cm.
$r$ = radius of resonator = 0.9 cm.
$\alpha_s$ = absorption coefficient in the resonator
$c$ = speed of light = $3 \times 10^{10}$ cm/sec.

Similar graphs may be constructed for other systems using different working medium and absorber materials and/or different resonator time constants.

Operation of a ruby laser with an absorber has borne out the theoretical considerations expressed above. In one case a ruby laser rod 10, which was 1 cm. in diameter and had a 90° orientation was excited in a suitable resonator cavity. The rear face 18 on the rod was 100 percent silvered and the front face 20 was then antireflection coated with MgF$_2$. The other mirror 27 of the Fabry-Perot was approximately 40 cm. from the face 20 of the ruby that was antireflection coated and was a dielectric 10 percent transmission, semimirror. Between the external Fabry-Perot mirror 27 and the antireflection-coated face 20 of the ruby rod 10 was a Keplerian telescope, corresponding to lens 22 of FIG. 3. A 1 cm. x 1 cm., 57° oriented, 0.04 percent ruby rod absorber 25 was placed near the focus of the telescope. The ruby absorber 25 was rotated so as to be maximally coupled to the laser light produced by the 90° oriented pumped ruby rod 10. With a 750 electrical joule input to the system, oscillation in a single sharp spike occurred at approximately 590$\mu$ secs. Without the ruby absorber oscillation would have occurred at approximately 400$\mu$ secs. Thus, the threshold of oscillation was increased by the use of the absorber.

While the embodiment of the invention using the optical avalanche technique has been described as using a ruby-working medium and a ruby absorber, it should be understood that the principles of the invention are not limited thereto. For example, any suitable laser-working medium of either solid, liquid or gaseous form may be used. Many such materials are already known to be capable of producing laser action upon injection of the proper type of pumping energy. Similarly, the material for absorber 25 may also be solid, liquid or gaseous. In general, the absorber material is selected so that it can be reused to produce many output pulses sufficiently resistant to thermal shock to withstand the high peak power output pulses of the laser. While it is simple and convenient for the laser-working medium and the absorber rod to be of the same material, use of a different absorber medium will be advantageous in certain instances. While using the same material for the working medium and the absorber assures that the working medium will produce light of the proper frequency to cause transition of the electrons in the atoms of the absorber to drive it to a transparent state, different materials properly selected can be used for the absorber and the working medium to achieve the same result. For example, a solid, liquid or gaseous working medium may be used with a different gaseous absorber. As is known, certain gases, particularly molecular gases, have numerous relatively wide bandwidth absorption lines and thus they have a high probability of suitability for a given working media. Also, the absorption band of a gas used as the absorber may be broadened, within limits, by increasing the pressure of the gas.

FIG. 4 shows the principles of the optical avalanche technique applied to a gaseous working medium. Here, a sealed tube 50 contains a quantity of a suitable gaseous working medium 52 capable of producing laser light. Pumping energy is supplied by a suitable source of radio frequency energy 54 to two electrodes 55 which are capacitively coupled to tube 50. The rear end of the tube has a semitransparent mirror 57 while the front end has a transparent face 59 cut at the familiar Brewster's angle. The gaseous laser-working medium operates in the conventional manner with the electrons of the gas being excited by the radio frequency pumping energy to produce light output which would normally, in the absence of absorber 25, be continuously emitted from mirror 57.

The absorber 25 located adjacent the transparent face 59 is formed by a sealed tube 60 with two transparent faces 61 and 62. These faces are also placed at Brewster's angle. The tube 60 contains a quantity of a gas which acts as the absorber material in a manner similar to that described for the absorber of FIG. 2. A reflecting mirror 27 is placed adjacent face 62 to complete the optical path for the optical resonator.

In the embodiment of FIG. 4, a beam-converging optical system is not shown between the working medium and the absorber 25. It should be understood that such an optical system may be provided, if needed. The absorber, if of the same material as the laser medium, needs a higher 1011 light energy density than the working medium to render its saturation rate sufficiently fast to "dump" the energy of the laser medium. Where the working medium and the absorber are of the same material, an optical system is necessary to provide the necessary demagnification. This was explained with respect to equations (10) and (11). Where the working medium and absorber materials differ, demagnification may not be needed since an absorber medium can be used which saturates more rapidly than the working medium. If this is the case, a demagnifying optical system is not needed.

As explained above, the same or different gases may be used for the working medium and absorber. Generally, a few milimeters' thickness of the absorber gas at or above atmospheric pressure will be all that is needed to produce adequate absorption for shutter action in the manner described with respect to FIG. 2. It will be appreciated that FIG. 4 is not scaled to indicate the relatively small thickness of absorbing gas required. As point out above, the bandwidth of the absorption lines of the gaseous absorber may be widened by increasing the gas pressure. Also, the thickness of the gas absorber can be varied to control the oscillation threshold of the laser.

In the case where the working medium and absorber gases are different, molecular gases are preferably used for the absorber. Molecular gases are readily suitable to achieve coincidence between the absorption band of the absorber gas and the frequency of the output light of the laser-working medium. Iodine and bromine are particularly suitable as the absorber gases. Molecular gas absorbers which dissociate and thereby enhance the operation of the absorber will be advantageous. Of course, other suitable molecular gases, either dissociable or nondissociable, may be used. Also, an atomic gas which is different from the working medium can also be used where a suitably fortuitous coincidence of spectral lines occurs.

The operation of the gaseous laser of FIG. 4 is similar to that of FIG. 2. Pumping the gaseous working medium 52 produces laser light which exits through transparent face 59 into the absorber 25. The gas in absorber 25 is excited by the absorbed laser light which is reflected back into tube 50 by mirror 27. At a predetermined light output threshold of the working medium, the gas in the absorber will be "burned through" and the absorber will effectively become transparent. This dumps the energy stored in the working medium at a higher threshold level than that normally obtainable without the absorber and produces an output pulse from end 57 with relatively high peak power.

It should be understood that the optical avalanche technique described herein has several advantages. First of all, the light shutter action is passive and no additional output power, and associated power supplies, are needed to operate the absorber. Nevertheless, the absorber is not necessarily destroyed each time an output pulse is produced. The pulsing action is subject to control so that single high peak power pulses may be obtained.

The optical avalanche technique heretofore described also has applications for selecting a particular mode of laser oscillation, out of several transverse modes produced. As is known, oscillation by a laser-working medium is sometimes characterized by oscillation in more than one mode. The modes of the transverse type appear, when the laser output is presented on a screen, as separate light patterns spaced with respect to the optical axis of the resonator. Several techniques have already been used for mode selection, a simple one of which involves the use of a lens and pinhole collimator inserted in the resonator light path to permit passage only of light of the desired mode.

FIG. 5 shows a system using the optical avalanche technique for mode selection. Here the laser-working medium 70, either solid, liquid, or gas, has a semitransparent mirror 71 located adjacent its rear face. The pumping source and the other system elements are conventional and have been omitted for clarity. Similarly, the Brewster angle interfaces have been omitted, but may be included if desired. The front face of the medium is left transparent and the laser light appears at one face of a double convex lens 73 whose focal point is located within the confines of the absorber 25. As explained before, the absorber may also be of solid, liquid or gaseous material, the same or different than that of the working medium. Another double convex lens 74 is located between the absorber 25 and the mirror 27. Other suitable types of optical systems may alternatively be used for demagnification.

The optical lenses 73 and 74 are physically located to cooperate with reflectors 27 and 31 to provide the desired resonator configuration and characteristics.

The resonator can readily be designed so that one particular transverse mode (or direction of propagation) will predominate; this is usually the case in any event. The focal point in the absorber for each transverse mode (or direction of laser rays) will be unique as is apparent from fundamental optical principles. The cones representing the volume of the absorber traversed by a particular mode can be made sufficiently small so that there is little or no overlap between adjacent transverse modes. Thus, a particular double conical volume of absorber 25 receives light energy density almost exclusively from the desired predominant mode rather than from all other modes. Due to its higher energy density the light from the desired mode will "burn through" the absorber in this small double conical volume and render it transparent before the light energy from the other modes could accomplish the same result in their respective volumes. This means that the energy of the desired mode stored in the working medium is dumped and the gain for all modes is decreased before the energy (and again) of the other modes reach the elevated oscillation threshold due to the absorber. Since dumping the energy drives the gain of the working medium for all modes towards zero, modes other than the desired predominant mode never have an opportunity to have their energy dumped.

Thus, the optical avalanche technique produces mode selection in a manner such that only the predominant mode has its stored energy dumped. This is quite different from other mode selection systems where the energy with a selected direction of propagation which may or may not represent a predominant mode is selected while others are blocked. It should be understood that the peak power output of the selected mode may be simultaneously increased by raising the oscillation threshold through the use of the absorber in the manner previously described.

In addition to the various modifications and variations of the invention described and suggested, numerous other modifications to the particular embodiments shown and suggested will be apparent to those of skill in the art. Accordingly, the scope of the invention should not be limited to the particular embodiments of the invention shown and suggested but should be determined by reference to the appended claims.

What I claim is:

1. A laser system for producing output pulses of relatively high peak power comprising:
   an optical resonator including a laser-working medium,
   pumping means for supplying pumping energy to said working medium to produce a laser light output,
   first and second reflector means which are at least partially reflective located opposite respective output ends of the working medium to form a repetitive optical path for the laser light in the resonator, and
   a gaseous absorber means located in the optical path between said working medium and one of said first and second reflector means for absorbing the light energy produced by said working medium until rendered relatively transparent upon receipt of a sufficient amount of energy from said working medium to open the optical path and release the light energy stored in the working medium.

2. A laser system as set forth in claim 1 wherein the gas of said absorber means is atomic.

3. A laser system as set forth in claim 1 wherein the gas of said absorber means is molecular.

4. A laser system as set forth in claim 3 wherein the molecular gas of said absorber means is selected from the group consisting of iodine and bromine.

5. A laser system as set forth in claim 1 wherein the working medium is also gaseous.

6. A laser system as set forth in claim 5 wherein the gas of said working medium is the same as the gas of the absorber means.

7. A laser system as set forth in claim 5 wherein the gas of said absorber is different from the gas of the working medium.

8. A laser system as set forth in claim 7 wherein the gas of the absorber means is molecular.

9. A laser system as set forth in claim 1 wherein the gaseous absorber means is unpumped.

10. Apparatus for selecting the predominant mode of oscillation of a laser to the exclusion of other modes comprising:
 an optical resonator including a laser working medium to produce laser light output and first and second reflector means which are at least partially reflective located opposite respective output ends of the working medium to form a repetitive optical path for the laser light in the resonator, the working medium in said resonator producing laser light output in a predominant mode,
 pumping means for supplying pumping energy to said working medium to produce said laser light output,
 gaseous absorber means located in the optical path between said working medium and one of said first and second reflector means for absorbing the laser light output produced by said working medium, said absorber being saturable to become relatively transparent upon receipt of a sufficient amount of light energy from the predominant output mode of said working medium to open the optical path between said working medium and said one reflector means and release the light energy of the predominant mode stored in said working medium and said absorber means being self-restoring to the absorbing condition after release of the light energy stored in said working medium, and
 an optical system interposed between said working medium and said absorber means for focusing a predominant mode of the laser light output beam of the working medium onto said absorber means whereby said predominant mode will render said absorber means relatively transparent and prevent other modes from reaching their respective thresholds of oscillation.

11. Apparatus as set forth in claim 10 wherein the materials of the working medium and the absorber means are the same.

12. A laser system comprising:
 a laser-working medium,
 pumping means for supplying pumping energy to said working medium to produce a laser light output, and
 a saturable gaseous absorber means located in the optical path of the output of said working medium for absorbing the light energy produced by said working medium until rendered relatively transparent upon receipt of a sufficient amount of energy from said working medium.